United States Patent [19]
Yalovega et al.

[11] Patent Number: 5,559,385
[45] Date of Patent: Sep. 24, 1996

[54] STATOR OF AC ELECTRIC MACHINE

[75] Inventors: Nikolai V. Yalovega; Sergei N. Yalovega; Konstantin A. Belanov, all of Moscow, Russian Federation

[73] Assignee: Maloe Nauchno-Vnedrencheskoe Predpriyatie "KOPEN", Moscow, Russian Federation

[21] Appl. No.: 351,463
[22] PCT Filed: Jun. 29, 1993
[86] PCT No.: PCT/RU93/00145
§ 371 Date: Dec. 9, 1994
§ 102(e) Date: Dec. 9, 1994
[87] PCT Pub. No.: WO94/24757
PCT Pub. Date: Oct. 27, 1994

[30] Foreign Application Priority Data

| Apr. 14, 1993 | [RU] | Russian Federation | 93019472 |
| Apr. 14, 1993 | [RU] | Russian Federation | 93019473 |
| Apr. 14, 1993 | [RU] | Russian Federation | 93019474 |
| Apr. 14, 1993 | [RU] | Russian Federation | 93019495 |
| Apr. 14, 1993 | [RU] | Russian Federation | 93019814 |
| Apr. 14, 1993 | [RU] | Russian Federation | 93019815 |
| Apr. 14, 1993 | [RU] | Russian Federation | 93019817 |
| Apr. 14, 1993 | [RU] | Russian Federation | 93019818 |

[51] Int. Cl.$^6$ .................................................. H02K 3/28
[52] U.S. Cl. .................................... 310/198; 310/184
[58] Field of Search ............................. 310/254, 179, 310/180, 184, 198

[56] References Cited

U.S. PATENT DOCUMENTS

| 4,338,534 | 7/1982 | Broadway | 310/184 |
| 4,890,049 | 12/1989 | Auinger | 310/184 |
| 4,896,063 | 1/1990 | Roberts | 310/184 |
| 5,128,570 | 7/1992 | Isozaki | 310/180 |
| 5,274,322 | 12/1993 | Hayashi et al. | 310/198 |

FOREIGN PATENT DOCUMENTS

| 0271604 | 6/1988 | European Pat. Off. . |
| 79623 | 11/1965 | U.S.S.R. . |
| 1257195 | 12/1971 | United Kingdom . |

OTHER PUBLICATIONS

WO 86/07656 published Dec. 31, 1986.

Primary Examiner—Thomas M. Dougherty
Assistant Examiner—Judson H. Jones
Attorney, Agent, or Firm—Collard & Roe, PC

[57] ABSTRACT

A stator with a magnetic circuit having separate slots to accommodate coil groups of a three-phase delta- and star-connected windings. Vectors of magnetic induction of each coil group intersect an axis of the magnetic circuit. The coil groups of like phases overlap one another in a cross section of the stator and are displaced through 30 electrical degrees. The three-phase windings are made with similar power ratings. This provides substantial temporal and geometric orthogonality between pairs of vectors of one phase of one three-phase winding and the coil groups of the next phase of the other three-phase winding.

4 Claims, 2 Drawing Sheets

STATOR OF AC ELECTRIC MACHINE

BACKGROUND OF THE INVENTION

1. Field of the Invention

The invention relates to ac electric machines and more specifically to a stator an ac electric machine.

2. The Prior Art

Widely known in the prior art at present is a stator or an ac electric machine (EP 0271604), having a cylindrical magnetic circuit which occupies a set phase zone. The slots of the machine internally accommodate coil groups of two three-phase windings which are star and delta-connected and provided with three leads designed for connection to an external mains.

Previously, a star-connected three-phase winding is a main winding, while a delta-connected three-phase winding is an auxiliary winding with a substantially-reduced power (of up to two orders of magnitude). Both windings are connected in parallel to a supply source and are accommodated in common slots of the magnetic circuit. The coil groups of like phases of the three-phase windings are displaced relative to one another in the cross section of the stator through 90 electrical degrees and their corresponding leads are connected to different bus bars of a three-phase mains, where the time-phase displacement comprises 120°.

The embodiment and disposition of the three-phase windings described hereinbefore is intended to compensate for odd harmonics of an electromagnetic field of the electric machine stator. From this standpoint the characteristics of the stator electromagnetic field are upgraded, however this known design solution has no effect on the conversion of electrical energy into mechanical energy (operation in motor mode) and vice versa (operation in generator mode). In addition, there is no effect on the function of an electric machine as determined by speed-torque characteristics, torque ratio, current ratio, etc.

It is know that the electromagnetic force $\overline{F}$ in an ac electric machine applied to bus bars of the rotor depends on a magnitude of the vector of current $\overline{I}$ passing through the rotor bus bar and induced according to the electromagnetic induction law. The vector is induced by the magnetic flux of one phase of the stator on a magnitude of the vector of the magnetic induction $\overline{B}$ of the magnetic field of another phase of the stator, as well as on a geometric angle between the vectors which follows from Ampere's formula:

$$\overline{F} = \overline{B} \times \overline{I} \times 1 \sin \widehat{\overline{BI}},$$

where 1 is the active length of the rotor bus bar.

Thus, the optimum conditions for conversion of electrical energy into mechanical energy and vice versa will take place with the availability of geometric orthogonality and phase coincidence of vectors of the rotor current and stator magnetic induction.

At the same time, it is known that according to the electromagnetic induction law the rotor current lags from the magnetic field which induced the latter through a phase angle $\pi/2$. From this it follows that the optimum conversion of energy as applied to the stator of an electric machine described hereinbefore will take place in case when the geometric and phase angles between the vectors of magnetic induction of the adjacent phases of the stator will be equal to $\pi/2$. In other words geometric and phase orthogonality will provide optimum energy conversion.

In a known stator, the geometric and phase angles between said vectors of the magnetic induction comprise 90° and 120°, respectively. Due to such relative orientation of the magnetic induction vectors the latter, in the general case, do not intersect the axis of a magnetic circuit. This leads to the fact that the optimum conditions for conversion of electrical energy into mechanical energy and vice versa are provided only in a narrow speed range (close to a synchronous speed or when an electric machine operates with a small slip). In addition, the use of said stator in an electric machine, particularly in an electric motor, prevents parametric control of the motor without changing the frequency of supply current of voltage.

As a rule, electric motors are designed for a rated mode of operation in which they have a high efficiency from 80% to 90%. Practically, such a mode is comparatively rare in practice and in the case of frequent starts of the motor, variations of voltage in the supply mains, and periodic operation at no-load. The actual efficiency of the electric motor turns out to be low, around 6–17°. It should be noted that the electric motor with a known stator has a statistically unsteady speed-torque characteristic throughout 80% of the speed range and as a common induction motor, it has a torque ratio close to a unit and a current ratio of 6 to 7.5.

The known stator is characterized by a low manufacturability as the same slots of the magnetic circuit serve for accommodating the coils of both windings which ave conductors of different diameters. Such a process is labor intensive and makes it practically impossible to automate the assembly process.

SUMMARY OF THE INVENTION

The present invention provides a stator of an ac electric machine with such arrangement, of coil groups of the three-phase windings in the slots of a magnetic circuit. The relative position of the coil groups of like phases of the three-phase windings and selection of their power allows conversion of electrical energy into mechanical energy and vice versa in a mode close to the optimum. The conversion occurs over a wide speed range which in turn will upgrade the energy indexes of an ac electric machine with the proposed stator, will provide a parametric control of the rotor speed across a wide speed range without changing the current frequency and will improve the manufacturability of the stator.

These objects are attained by a stator of an ac electric machine comprising a cylindrical magnetic circuit, the slots of which are disposed in a set phase zone. The slots accommodate coil groups of two three-phase delta- and star-connected windings, and are provided with three leads for connection to an external circuit. According to the invention, the coil groups of each three-phase winding are accommodated in separate slots of the magnetic circuit so that the vector of the magnetic induction of the magnetic field induced by the current flowing through each of the coil groups intersects the axis of the magnetic circuit. In addition, the coil groups of like phases of the three-phase windings overlap one another in the cross section of the stator and are substantially displaced through 30 electric degrees. The three-phase windings are manufactured close in power which in total, substantially provides the time and geometric orthongonality between the pairs of vectors of the magnetic induction of the magnetic fields set up by the current flowing through the coil groups of one phase of the delta-connected three-phase winding and the coil groups of a next phase of the star-connected three-phase winding.

To provide the possibility for independent connection of the three-phase windings, it is expedient that the three-phase windings by provided with three additional leads so that each three-phase winding is provided with individual leads. Structurally, it is advantageous that the coil groups of the three-phase windings be disposed in separate slots of the magnetic circuit so that the phase zone occupied by each coil group in the cross section of the stator is a multiple of 30 within 60 to 180 electrical degrees, except for 150 electrical degrees.

The proposed stator makes it possible to convert electric energy into mechanical energy and vice versa in a mode close to the optimum due to fulfillment of the required conditions. If an electric motor with a widely used short-circuited rotor is provided with the proposed stator, then said motor becomes controllable by the amplitude of voltage, with the frequency of the supply current being unchanged. The speed-torque characteristic of such an electric motor becomes statically steady across the entire speed range and may have a "soft" or "excavator" form.

Besides the power of an electric motor provided with the proposed stator is stepped up by 30–40% in comparison with an electric motor having the known stator. Also, the mass and heat loads of the proposed stator remain the same. At the same time, the torque ratio is stepped up by 2.5–3 times, that is the starting torque is increased by 2.5–3 times in comparison with the known electric motor. The current ratio is decreased by 2.9–3.2 times, which improves the operational reliability of the electric motor by 2–3 times.

The use of independent leads of the three-phase windings makes it possible to individually control each of the three-phase windings. This in turn allows the speed-torque characteristic of a plurality of special-purpose electric machines to be adapted to a driven electric machine in the process of operation in compliance with a varying characteristic of the driven machine. Noteworthy also is a high manufacturability of the proposed stators allowing the process of assembly thereof to be automated which is of particular importance for electric machines with a number of poles 2p=2.

A very important advantage of the proposed stator resides in operating in a mode close to the idling current of the rated mode at a voltage comprising about 30% of the rated value (known electric machines are brought in a rated mode at a voltage differing from the rated value by not more than 5%). This fact leads to increase in a mean value of the efficiency with regard to frequent starts, variations in voltage of the supply mains, no-load operation and other factors. It should be noted that all the advantages listed hereinbefore are applicable to electric machines and are also inherent to electric generators provided with the proposed stator.

BRIEF DESCRIPTION OF THE DRAWINGS

The invention will now be described in greater detail with reference to specific embodiments thereof, taken in conjunction with the accompanying drawings, wherein.

DETAILED DESCRIPTION OF THE PREFERRED EMBODIMENT

Figure 1:
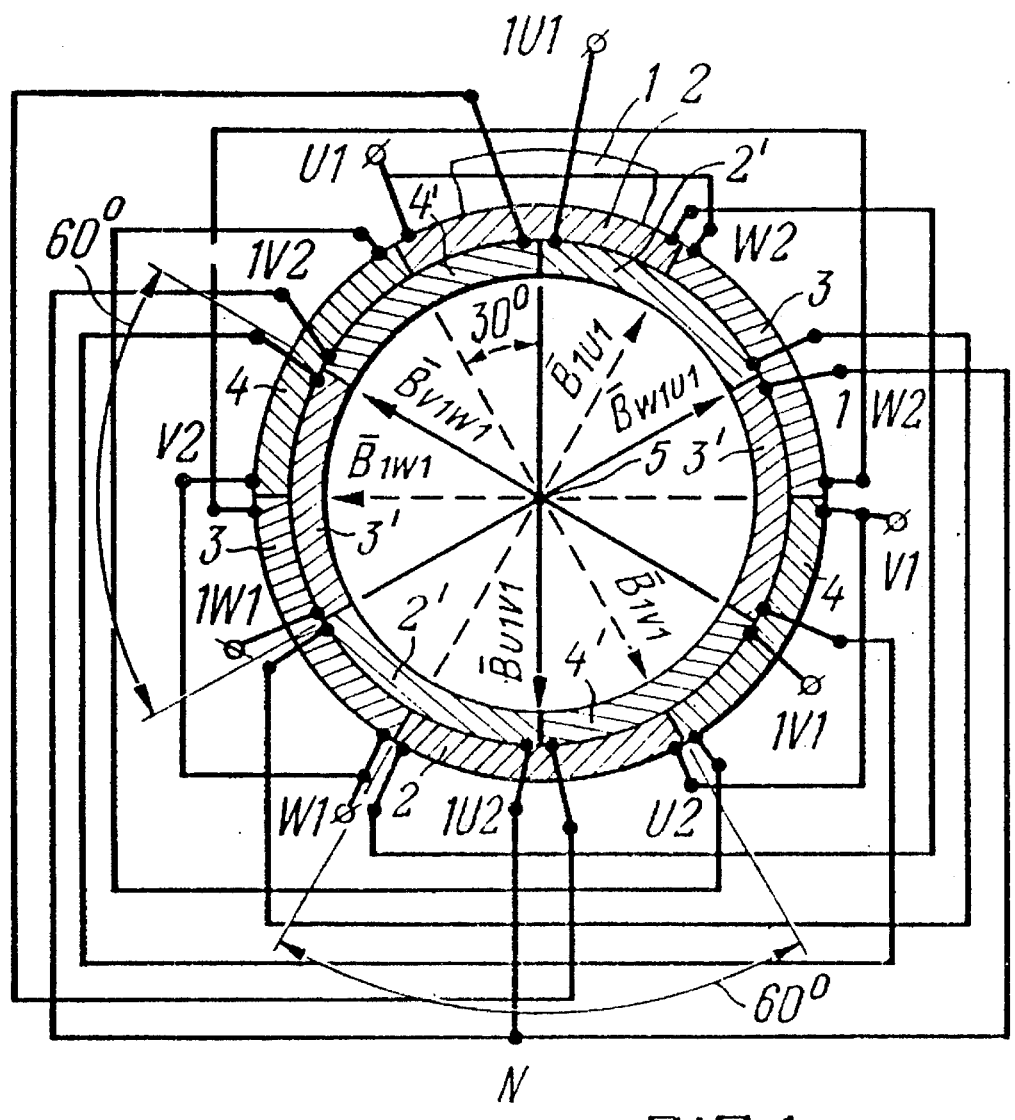
FIG. 1 illustrates a connection diagram of coil groups of three-phase windings of an ac electric machine stator, according to the invention.

FIG. 1 shows a stator of an ac electric machine including a cylindrical magnetic circuit 1 (FIG. 1) whose slots (not shown in the drawing and the magnetic circuit is illustrated arbitrarily) internally accommodate, along the circumference, coil groups 2, 3 and 4 of a delta-connected three-phase winding and coil groups 2', 3' and 4' of a star-connected three-phase winding. The three-phase windings are illustrated in FIG. 1 arbitrarily in a cross section of the stator, and in the herein described alternate embodiment the coil groups 2, 3 and 4 encompass the coil groups 2', 3' and 4' however, it will be apparent that said coil groups may be arranged in any other manner. Each coil group 2, 3 and 4; 2', 3' and 4' of the herein described alternative embodiment comprises two components (coils) symmetrically spaced along the circumference. Designations U1, V1, and W1 correspond to starting points of a delta-connected three-phase winding and designations U2, V2 and W2 correspond to ending points of said phases. Analogous designations are used for defining starting and ending points of a star-connected three-phase winding: 1U1, 1V1 and 1W1 are the starting points and 1U2, 1V2 and 1W2 are the ending points, respectively, and N is a neutral point (zero).

Referring to FIG. 1, there are shown continuous lines illustrating vectors of magnetic induction $\overline{B}U1V1$, $\overline{B}W1U1$, $\overline{B}V1W1$ of magnetic fields set up by currents passing through the coil groups 2, 3 and 4, respectively. Analogously, dash lines are used for illustrating vectors of magnetic induction $\overline{B}1U1$, $\overline{B}1W1$, $\overline{B}1V1$ of magnetic fields set up by currents passing through the coil groups 2', 3' and 4' of the star-connected three-phase winding.

The coil groups 2, 3 and 4; 2', 3' and 4' are disposed in the slots of the magnetic circuit 1 so that all the given vectors of the magnetic induction intersect an axis 5 of the magnetic circuit 1 which is one of the hereinbefore described conditions required for an optimum mode of the electric machine operation. The coil groups 2—2'; 3—3'; 4—4' of like phases of the three-phase windings overlap one another and are substantially displaced through 30 electrical degrees (an angle of 30° between the starting points of the coil groups 2—2' is illustrated as an example in the drawing which is valid and evident for other coil groups 3—3'; 4—4').

A necessity for displacement between the coil groups 2—2'; 3—3'; 4—4' of the like phases of the three-phase windings through an angle of 30 electrical degrees follows from the hereinbefore described analysis of the conditions required for an optimum conversion of electric energy into mechanical energy and vice versa. As the angle between the coil groups 2, 3 and 4; 2', 3' and 4' of one phase in each winding amounts to 120°, the angle between the vectors of magnetic induction of the coil groups 3, 4 and 2; 3', 4' and 2' of next phases should amount to 90 electrical degrees. In order to fulfil this condition the coil groups 2—2'; 3—3'; 4—4' of the like phases should be displaced through 30 electrical degrees. However, it is necessary to take into account that the high-energy parameters of an electric machine may be provided only if the phase zone occupied by one coil group 2, 3 and 4; 2', 3' and 4' is over 30 electrical degrees. Thus, the coil groups 2—2'; 3—3'; 4—4' of the like phases of windings with regard to their displacement through 30 electrical degrees should by all means overlap one another.

Such an arrangement of the three-phase windings in the slots of the magnetic circuit 1 makes it possible to achieve a substantially geometric orthogonality between the pairs of vectors of magnetic induction of the magnetic fields set up by currents passing through the coil groups 2, 3 and 4 of one phase of the delta-connected three-phase winding and the coil groups 3', 4' and 2' of the next phase of the star-connected three-phase winding. So in the herein described alternative embodiment the orthogonality is observed between the following pairs of the magnetic induction vectors: $\overline{B}U1V1$ (coil group 2) and $\overline{B}1W1$ (coil group 3'); $\overline{B}W1U1$ (coil group 3) and $\overline{B}1V1$ (coil group 4'); $\overline{B}V1W1$ (coil group 4) and $\overline{B}1U1$ (coil group 2').

In the herein describer alternate embodiment of the invention, each three-phase winding has individual leads which make it possible to accomplish a parallel or an independent connection to an external circuit (supply source or load). So, the starting points U1, V1, W1, 1U1, 1V1, 1W1 of respective phases of the windings serve as leads of the delta-connected winding and as leads of the star-connected winding.

An obvious advantage of the herein described construction resides in that an independent three-phase supply source (load) may be connected to each of the three-phase windings which allows the parametric control to be effected both as a combined (joint) control and a separate (individual) control. This makes it possible to control the form of the speed-torque characteristics which may be in a "soft" or an "excavator" form statistically steady throughout the entire speed range. Due to the fact that the speed-torque characteristics are widely known, they are not illustrated in the drawing.

Figure 2:
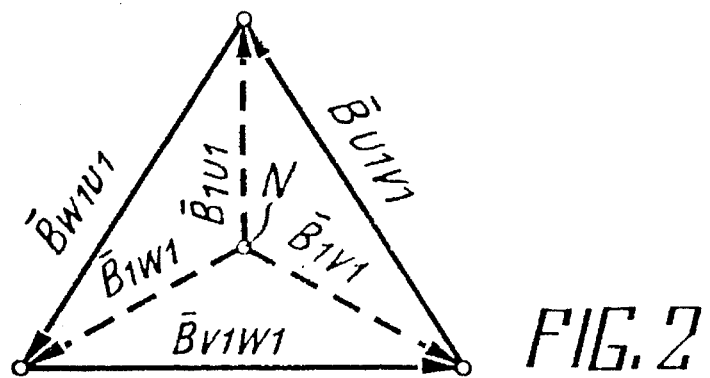
FIG. 2 illustrates a vector diagram of magnetic induction of coil groups of the three-phase winding connected according to FIG. 1.

Referring now to FIG. 2, there is shown the vector diagram of magnetic induction of the coil groups 2, 3 and 4; 2', 3' and 4' of the three-phase windings connected in the manner described hereinbefore. The three-phase windings are made close in power (design) which makes it possible to achieve the phase angle close to $\pi/2$. In other words, it is possible to achieve a time orthogonality between said pairs of vectors of the magnetic induction: $\overline{B}U1V1$ and $\overline{B}1W1$; $\overline{B}W1U1$ and $\overline{B}1U1$; $\overline{B}V1W1$ and $\overline{B}1V1$.

Achieving geometric and temporal orthogonality between the vectors of magnetic induction provides the required conditions for an optimum conversion of electrical energy into mechanical energy and vice versa. It should be noted that space relations may be effected with an error depending upon design and technological causes.

It should also be noted that there is a one-to-one correspondence between the direction of the vector of magnetic induction of the coil group 2, 3 and 4; 2', 3' and 4' of the phase winding or of the stator as a whole. There is also one-to-one correspondence in the direction of the stator current or EMF on the one hand, and the arrangement of coil groups 2, 3 and 4; 2', 3' and 4' and the phase relations of currents therein on the other hand. Therefore, the arrangement of the coil groups 2, 3 and 4; 2', 3' and 4' may be assigned by the direction of the induction vector and vice versa. In other words, the coil groups 2, 3 and 4; 2', 3' and 4' are arranged and connected to an external circuit so that the phase and space relations described hereinbefore are observed.

In the alternative embodiment of the invention, the phase zone occupied by each coil group 2, 3 and 4; 2', 3' and 4' comprises 60 electrical degrees (in the drawing the phase zone is marked as an example for the coil group 3').

In other alternate embodiments of the invention, the magnitude of the phase zone may amount to 90, 120 or 180 electrical degrees. Selection of the phase zone magnitude is fully determined by the requirements to be met by the electric machine. When the magnitude of a phase zone amounts to 60 or 90 electrical degrees, it is possible to cut down the weight of a machine and consumption of copper for windings, and for electric machines having the number of pairs of poles 2p=(3000 rpm) it is also possible to automate the process of laying windings. When the magnitude of the phase zone amounts to 120 or 180 electrical degrees the energy indexes of an electric machine are stepped up. A fragment of the diagram illustrating the layout of the coil groups 2—2'; 3—3' of the three-phase windings into the slots 6 (FIG. 3) of the magnetic circuit 1 shows that conductors of the coil groups 2—2'; 3—3' are laid in the separate slots 6. For convenience the conductors of the coil groups 2 and 3 of the delta-connected winding are illustrated in the drawing by continuous lines, while the conductors of the coil groups 2' and 3' of the star-connected winding are illustrated by dash lines. Reference numbers from 1 to 15 shown on a section of the magnetic circuit 1 are in compliance with the accepted numbering of the slots 6 of the magnetic circuit 1 of an electric machine stator.

Figure 3:
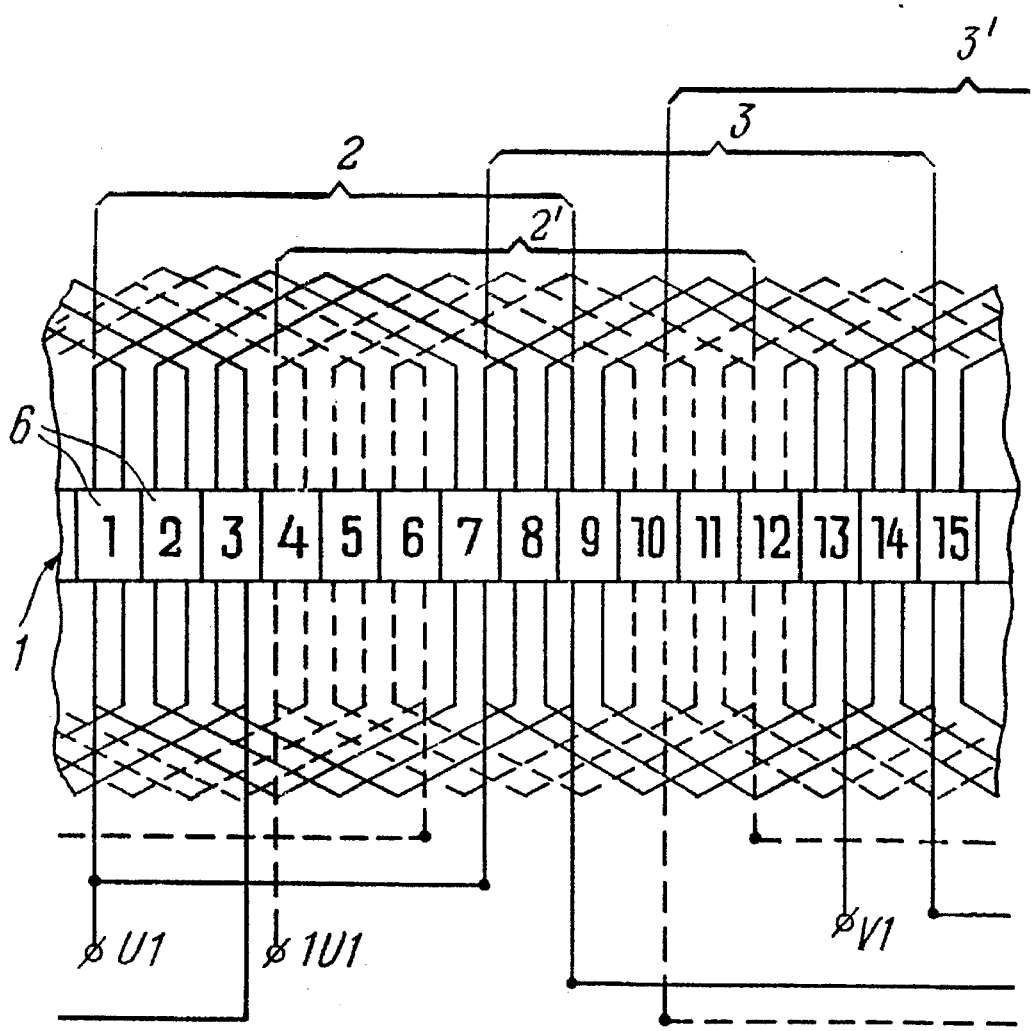
FIG. 3 is a fragment of the diagram illustrating the layout of coil groups of three-phase windings in slots of the magnetic circuit, according to the invention.
Figure 4:
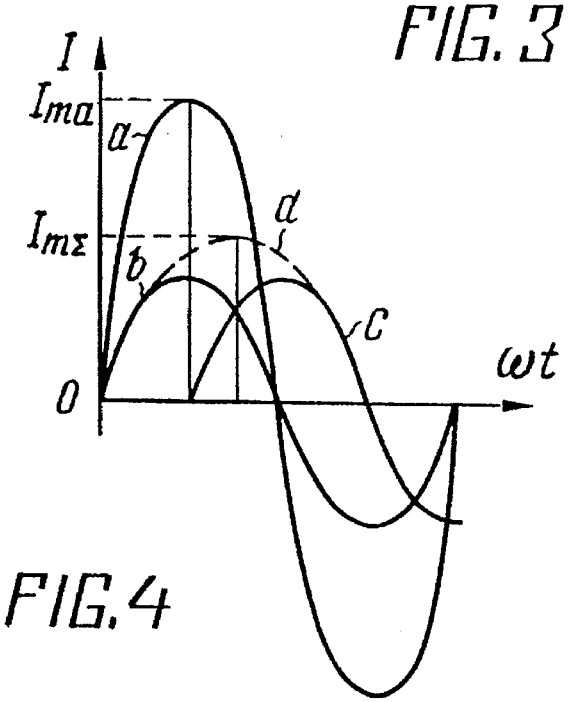
FIG. 4 is a time diagram of currents induced in three-phase windings of an ac electric machine stator.

Shown as an alternative embodiment of the invention is the winding of an electric machine having 36 slots in which each slot 6 occupies 10 electrical degrees. From this it follows that the phase zone occupied by each coil group 2 and 2'; 3 and 3' comprises 90 electrical degrees. Such an electric machine has the following number pairs of poles 2p=2. Referring now to FIG. 3, there is shown an alternative embodiment of a double-layer winding, however it will be apparent that in other alternative embodiments the winding may be of a single-layer or one and a half-layer type depending on the requirements to be me by electrical machines. Referring to FIG. 4, there is shown a time diagram of currents corresponding to magnetic fluxes in the stator three-phase windings. Curve a corresponds to current of the stator of a known machine, while curves b and c correspond to currents in the three-phase windings of the proposed stator. Curve d is a resultant of the curves b and c.

The proposed stator of an ac electric machine running in a motor mode operates in the following manner. Voltage of the three-phase mains is applied to the leads U1, V1, W1, 1U1, 1V1, 1W1 (FIGS. 1,3) of the windings, in bus bars of the motor rotor (not shown in the drawing). Induced currents cooperate with magnetic fields set up by the currents passing through the coil groups 2, 3 and 4; 2', 3' and 4' of the respective phases of the three-phase windings laid in the slots 6 of magnetic circuit 1.

As a result, an electromagnetic force is applied to bus bars of the rotor and directed tangentially to the surface thereof, which force develops the torque of the motor. When the proposed stator is used the magnitude of the electromagnetic force will be close to a maximum due to the design features the arrangement of the three-phase windings wherein the electric motor operates under conditions close to the optimum in conversion of electrical energy into mechanical energy.

The advantages of the proposed stator are illustrated by FIG. 4 presenting time diagrams of currents induced in the known stator and in the proposed stator. In the known stator, the amplitude of magnetic induction corresponding to the amplitude of current $I_{ma}$ (curve a) is limited by a saturation induction of the electrotechnical steel of which the magnetic circuit is manufactured. In the proposed stator, the motor torque is governed by a total magnitude of current $I_{m\Sigma}$ (curve d) obtained by addition of curves of the current in the three-phase windings displaced in phase through $\pi/2$ (curves b and c). It is seen from the graph that the amplitude $I_{m\Sigma}$ is by 30–40% smaller than $I_{ma}$, respectively and the amplitude of the total magnetic flux will be by 30–40% smaller than that of the known stator.

As a result, the working point on the magnetization curve of electrotechnical steel (it is not given in the drawing, as it is well known) is achieved in an electric machine having a substantially smaller mass and the same heat loads or in a machine having the same mass and overall dimensions where the power rating may be increased by 30–40%. At the same time, the torque ratio increases by 2.5–3 times and the current ratio decreases by 2.9–3.2 times which improves operating reliability of the electric machine with the proposed stator by 2–3 times.

When the stator is used in an electric generator, the torque is converted into appropriate three-phase voltages of the windings, provided the optimum conditions for conversion of mechanical energy into electric energy are duly observed. It should also be noted that the proposed stator steps up the mean value of efficiency with regard to variations in the load, frequent starts and stops, and periodic idle periods. This also makes it possible to control the rotor speed by the voltage amplitude with the frequency of the supply current being constant. The proposed stator is characterized by high manufacturability allowing automation of the assembly process.

The present invention may be used to advantage in production of ac motors and generators, in construction of drives with parametric control by voltage amplitude and with unchanged frequency of supply current, as well as in systems and installations requiring control of the rotational speed, operating in start-and-stop modes and under conditions of varying load and supply mains voltage.

The electric machines with the proposed stators may find wide application in mechanical engineering, oil and gas industry, in mining, and in manufacturing, light, food and other industries.

We claim:

1. A stator of an ac electric machine electrically coupled to an external circuit comprising:

a cylindrical magnetic circuit having a circumference and a plurality of slots spaced apart equidistantly along the circumference;

a delta-connected three-phase winding comprising three coil groups arranged symmetrically along the circumference and disposed within a first group of slots of said magnetic circuit to occupy a set phase zone and generate magnetic fields when a current passes therethrough, said magnetic fields being represented by magnetic induction vectors $\overline{B}U1V1$, $\overline{B}V1W1$, and $\overline{B}W1U1$; and a star-connected three-phase winding comprising three coil groups arranged symmetrically along the circumference and disposed within a second group of slots of said magnetic circuit, distinct from said first group of slots, to occupy a set phase zone and generate magnetic fields being represented by magnetic induction vectors $\overline{B}1U1$, $\overline{B}1V1$, and $\overline{B}1W1$, said delta-connected and star-connected three-phase windings having power ratings close to each other;

each three-phase winding having three leads adapted for connection to the external circuit, coil groups from each three-phase winding of like phases overlap one another in a cross section of the stator and are displaced 30 electrical degrees from each other, wherein temporal and geometric orthogonality occurs between pairs of magnetic induction vectors $\overline{B}U1V1$-$\overline{B}1W1$; $\overline{B}W1U1$-$\overline{B}1V1$; $\overline{B}V1W1$-$\overline{B}1U1$ generated by currents passing along coil groups of one phase of said delta-connected winding and coil groups of a next phase of said star-connected winding.

2. The stator according to claim 1, wherein each three-phase winding includes three additional leads adapted for connection to the external circuit so that each three-phase winding has a separate lead for independent connection of said winding to the external circuit.

3. The stator according to claim 1, wherein said coil groups are disposed within separate slots of said magnetic circuit so that in the cross section of the stator the phase zone occupied by each coil group is a multiple of 30 within a range from 60 to 180 electrical degrees, with the exception of 150 electrical degrees.

4. A stator of an ac electric machine electrically coupled to an external circuit comprising:

a cylindrical magnetic circuit having a circumference and a plurality of slots spaced apart equidistantly along the circumference;

a delta-connected three-phase winding comprising three coil groups arranged symmetrically along a circumference and disposed within a first group of slots of said magnetic circuit to occupy a set phase zone and generate magnetic fields when a current passes therethrough, said magnetic fields being represented by magnetic induction vectors $\overline{B}U1V1$, $\overline{B}V1W1$, and $\overline{B}W1U1$; and a star-connected three-phase winding comprising three coil groups arranged symmetrically along a circumference and disposed within a second group of slots of said magnetic circuit, distinct from said first group of slots, to occupy a set phase zone and generate magnetic fields being represented by magnetic induction vectors $\overline{B}1U1$, $\overline{B}1V1$, and $\overline{B}1W1$, said three-phase windings having power ratings close to each other;

each three-phase winding having three leads adapted for connection to the external circuit, coil groups from each three-phase winding of like phases overlap one another in a cross section of the stator and are displaced 30 electrical degrees from each other, wherein temporal and geometric orthogonality occurs between pairs of magnetic induction vectors $\overline{B}U1V1$-$\overline{B}1W1$; $\overline{B}W1U1$-$\overline{B}1V1$; $\overline{B}V1W1$-$\overline{B}1U1$ generated by currents passing along coil groups of one phase of said delta-connected winding and coil groups of a next phase of said star-connected winding;

wherein said coil groups are disposed within separate slots of said magnetic circuit so that in the cross section of the stator the phase zone occupied by each coil group is a multiple of 30 within a range from 60 to 180 electrical degrees, with the exception of 150 electrical degrees.

* * * * *